US007191023B2

(12) United States Patent
Williams

(10) Patent No.: US 7,191,023 B2
(45) Date of Patent: Mar. 13, 2007

(54) METHOD AND APPARATUS FOR SOUND AND MUSIC MIXING ON A NETWORK

(75) Inventor: Thomas D. Williams, Los Angeles, CA (US)

(73) Assignee: Cybermusicmix.com, Inc., Los Angeles, CA (US)

( * ) Notice: Subject to any disclaimer, the term of this patent is extended or adjusted under 35 U.S.C. 154(b) by 279 days.

(21) Appl. No.: 09/756,446

(22) Filed: Jan. 8, 2001

(65) Prior Publication Data

US 2002/0091455 A1 Jul. 11, 2002

(51) Int. Cl.
*G06F 17/00* (2006.01)

(52) U.S. Cl. ............................ 700/94; 700/96; 84/601; 84/609; 709/217

(58) Field of Classification Search ................. 700/94, 700/96; 84/602, 601, 609; 709/217; 345/727, 345/823, 961; 715/727, 530, 564, 823, 961; 704/270, 275; 455/185.1
See application file for complete search history.

(56) References Cited

U.S. PATENT DOCUMENTS 5,801,694 A * 9/1998 Gershen ..................... 715/727
6,192,340 B1 * 2/2001 Abecassis ................... 704/270

OTHER PUBLICATIONS

Robert et al. ; Customized Music Distribution and Playback System; Oct. 29, 1998; WO 98/48532.*

* cited by examiner

*Primary Examiner*—Melur Ramakrishnaiah
(74) *Attorney, Agent, or Firm*—Daniel L. Dawes; Myers Dawes Andras & Sherman LLP

(57) ABSTRACT

The website hosted by the server is a collection of separately recorded musical tracks with the music containing a minimum of at least one musical instrument or vocal. Users may record additional tracks of music to add to a primary track. There is one primary track and up to six accompaniment or comptracks. The server allows the client to add one or more tracks to any other tracks for a given song title within the database. Separate tracks then selected by the client and mixed in the mixer into a single sound recording which is then communicated over the server across the internet to the client so the client may hear the finished or composite mixed musical work. If the mixed or composite composition is not to the liking of the user, then different tracks may be selected or rerecorded mixed in sample again.

26 Claims, 15 Drawing Sheets

METHOD AND APPARATUS FOR SOUND AND MUSIC MIXING ON A NETWORK

BACKGROUND OF THE INVENTION

1. Field of the Invention

The invention relates to the field of sound mixing and in particular to methods and apparatus for mixing sound, such as music, in a distributed network environment such as the internet.

2. Description of the Prior Art

A conventional sound or music studio includes sound recording rooms where artists create live music in solo or in groups and equipment which records the music or sounds in separate tracks with or without electronic signal conditioning and with or without added special effects. Whatever track is recorded can be then mixed with one or more other prerecorded tracks, including variable signal processing of each of the tracks, to present a mixed track which comprises the final recording. Thus, a musical soloist may perform against himself or herself in prerecorded tracks or against an instrumental background and/or one or more prerecorded tracks to provide the input data from which a final mixed recording is produced. Performers of any one of the tracks can be rerecorded and remixed with differing signal processing or differing digital input, if the live performer or performers are present. Very often, instrumental tracks, rhythm tracks or special effect tracks will have been prerecorded at a prior time or at a different place while later tracks are added to the final mixed recording. In conventional studios it is necessary to have each of the tracks physically present in the studio in a tape form, regardless of when recorded. This means that media must be physically shipped to the sound studio in order for mixing to occur.

The sound recording mixing equipment is often complex and requires the services of a highly skilled and highly compensated sound recording engineer. Thus, the hourly cost of sound recording studios can be high because of the requirement of the assistance of a skilled sound recording engineer as well as the cost of expensive equipment, which must be amortized over the limited number of recording hours which the studio has available and is being operated. All of these factors make sound recording studios not only non-interactive with the performer, but completely out of economical reach from all of the professional performers and thus limited even within the class of professional performers to those who have some type of financial backing or recording contract. The use of sound recording studios for amateur performers for their own enjoyment is thus almost always economically ruled out.

Therefore, what is needed is some type of apparatus and method which will allow the benefits of a sound recording studio to be made available to everyone, including amateur performers, over the entire globe and in a manner which is arbitrarily displaced in time and at an economical level.

BRIEF SUMMARY OF THE INVENTION

The invention is an apparatus for delivering a user-selected plurality of mixed data files over a distributed network comprising a server coupled to the distributed network and a client coupled to the distributed network. A database stores the plurality of data files communicating with the server. A mixer communicating with the database and server mixes selected ones of the plurality of data files together. A recorder communicating with the client records a user-created data track. The client transfers the user-created data file to the server and hence to the database.

The server transfers a user-selected mixed data file to the client comprised of at least two data files selected by a user from the database. The client replays the mixed data file. The client may store the mixed data file. The data files processed by the server, client, database, mixer and recorder process comprise audio data files and in particular music data files, which in the illustrated embodiment are formatted as wav files.

The server and client compress data files communicated with the network and uncompress files received from the network. In addition the data files processed by the server, client, database, mixer and recorder process further comprise associated text data files, and/or picture data files.

The data files stored on the database include data fields for categories and subcategories of data files, such as categories and subcategories of music styles.

The data files stored on the database are characterized as a primary track data file or an accompaniment track data file. The mixer mixes into a single data file one primary track data file with at least one accompaniment track data file, but usually a plurality of accompaniment track data files with the primary track data files. In a typical use at least one of the primary track data file or the accompaniment track data file is user created.

The invention can also be defined as a method for delivering a user-selected plurality of mixed data files over a distributed network comprising the steps of recording a user-created data file on a client and transferring the user-created data file from the client to a server on the distributed network and to a database communicated with the server. The database has stored thereon a plurality of data files. Selected ones of the plurality of data files are mixed together according to user selection. The mixed plurality of data files are transferred from the server to the client via the distributed network. Mixing selected ones of the plurality of data files together mixes at least two data files selected by a user from the database.

The method further comprises the step of replaying the mixed data file by the client and/or storing the mixed data file in the client. Transferring the user-created data file from client to the server, mixing selected ones of the plurality of data files together and transferring the mixed plurality of data files from the server to the client comprises the steps of transferring a user-created audio data file from the client to the server. The database has a plurality of audio files stored therein. The method thus comprises the steps of mixing selected ones of the plurality of audio data files together, and transferring the mixed plurality of audio data files from the server to the client. The audio files are in particular music files preferably formatted as wav files. The method further comprises the steps of compressing the data files communicated with the network and uncompressing data files received from the network.

Still further method further comprises the steps of creating a text and/or picture file associated with a user-created data file on a client, and transferring the associated text and/or picture file from the client to a server on the distributed network and to a database communicated with the server. The database has stored thereon a plurality of data files each with a text and/or picture files associated therewith. The method continues with the step of transferring the mixed plurality of data files from the server to the client via the distributed network with associated text and/or picture files corresponding to each data file which has been mixed together.

The step of transferring the user-created data file from the client to a server on the distributed network and to a database communicated with the server comprises the step of transferring the user-created data files with fields for categories and subcategories of data files, namely categories and subcategories of music styles.

The step of transferring a user-created music data file from the client to the server comprises in the typical use the step of transferring the music data files as a primary track data file or an accompaniment track data file. The method further comprises the step of mixing into a single data file one primary track data file with at least one accompaniment track data file, and preferably a plurality of accompaniment track data files with the primary track data files. Typically, the step of recording a user-created data file on a client records at least one of the primary track data files or the accompaniment track data files.

While the invention has been describe above in terms of steps for grammatical ease, it must be expressly understood that the above disclosure and claims are not limited to the means/steps limitations of 35 USC 112. Invention having been briefly summarized, it may be better visualized by turning to the following drawings where like elements are referenced by like numerals.

The invention and its various embodiments may now be understood by turning to the following detailed description of the preferred embodiments.

DETAILED DESCRIPTION OF THE PREFERRED EMBODIMENTS

Figure 1:
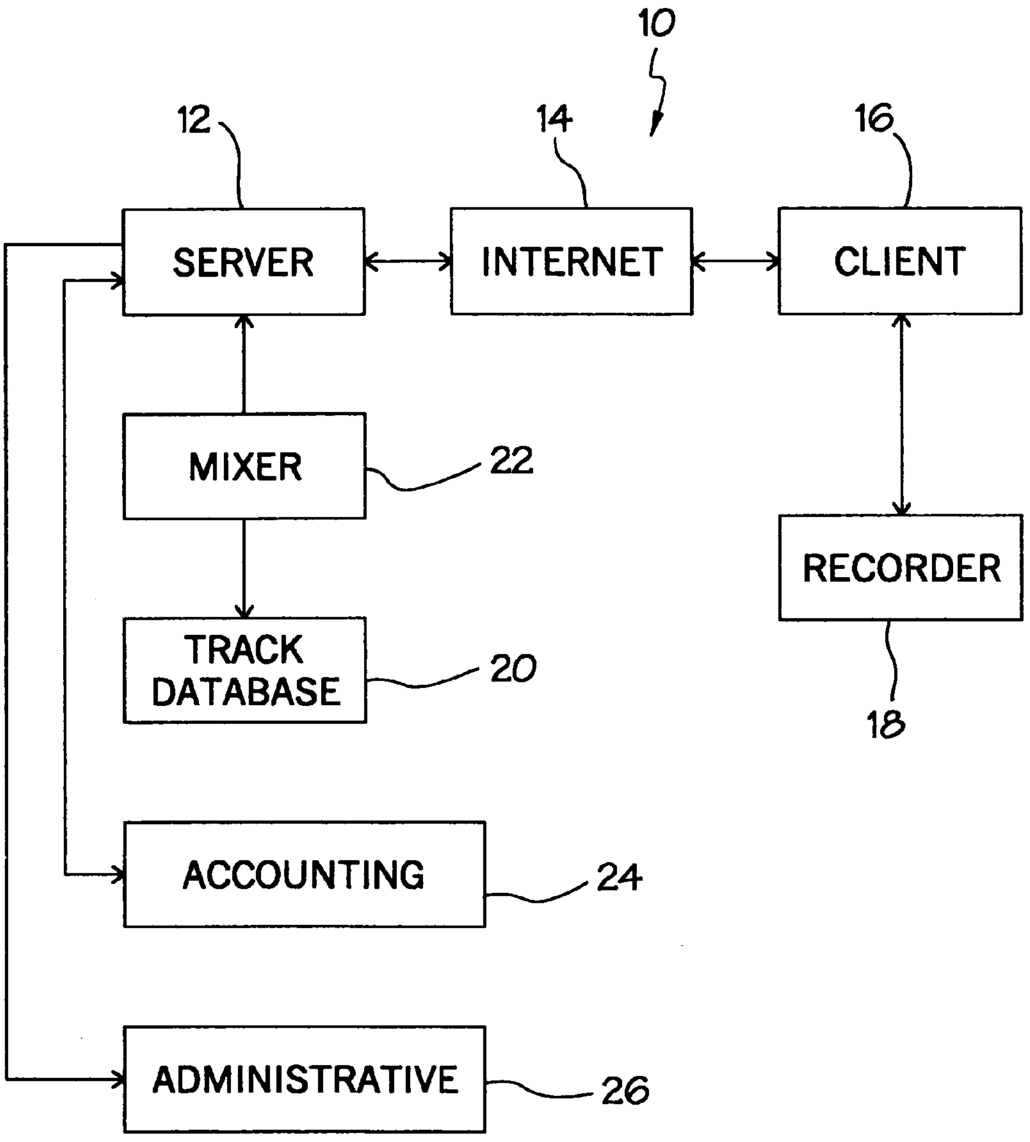
FIG. 1 is a block diagram of a server organized and operating according to the invention communicating over the network with a client utilizing a recorder adapted to operate as part of the invention.

The invention, generally denoted by reference numeral 10, is illustrated in the block diagram of FIG. 1, wherein a server 12 is coupled through internet 14 to a multiplicity of clients 16 one of which is depicted in FIG. 1. Server 12 and client 16 each comprise conventional computer systems which may include a number of memories, and peripherals which are not expressly diagrammed in FIG. 1. Client 16 has an onsite recorder software module 18 which, as described below, which enables client 16 to record one or more sound tracks offline, to upload those soundtracks to server 12, and to download soundtracks to from server 12 from replay and storage in client 16.

Server 12 is communicated with a track database 20 and a mixer module 22 in which multiple tracks stored in database 20 provided by client 16 or otherwise preloaded into database 20 may be mixed into a single music track in a compressed or coded form which can be practically communicated over limited bandwidth of internet 14. Server 12 is provided with an accounting module 24 to keep track of client use and billing, and a backend administrative module 26 for the maintenance and development of the website and the content on the website held by server 12. It will be understood by the following that system 10 of FIG. 1 provides a virtual music studio on the internet.

The functionality in the invention and this operation can be better understood by first considering the architectural organization of the website stored on server 12 and made available through communication through internet 14. The following description of the website is entirely illustrative and should not be read as limiting or restricting the invention. It is explicitly understood that the invention may be implemented using many different websites organizations which are materially different from that described below. However, the invention can be best understood by considering an illustrative example of one such website.

The basic organization of the website within server 12 is a collection of separately recorded musical tracks with the music containing a minimum of at least one musical instrument or vocal. Users may record additional tracks of music to add to a primary track. In the illustrated embodiment there is one primary track, typically but not necessarily the melody, and up to six accompaniment or comptracks. For example, the melody may be the vocal track and the comptracks are then one or more musical accompaniment rhythm and harmony tracks. Server 12 allows client 16 to add one or more tracks to any other tracks for a given song title within database 20. For example, a vocal primary track may be recorded for a given song and a web user may then add his or her own track of guitar accompaniment. Similarly, the same song may have a vocal, guitar and rhythm track prerecorded by various musicians, and client 16 may substitute his or her own track for any one or more of these tracks to assemble a new collection of tracks for the given song title. Separate tracks then selected by client 16 are mixed in mixer 22 into a single sound recording which is then communicated over server 12 across internet 14 to client 16 so the client may hear the finished or composite mixed musical work. If the mixed or composite composition is not to the liking of the user, then different tracks may be selected or rerecorded mixed in sample again. If a mixed musical work meets the satisfaction of the user he is then able to download it through client 16 into a sound file, typically an MP3 file, which can then be replayed by the user as often as desired or recorded onto a CD or other storage medium.

In addition to being a library of separate tracks for a given song title which are accumulated within database 20, it is possible for the composer of the song title or any one of the performers of any one of the tracks to sample the library and mix their own selection of the various tracks from remote prerecorded artists to create a finished mixed work of their own selection from those that are available. This can be then downloaded through client 16 for permanent recordal by recorder 18. This then allows a vocalist in Detroit to use a guitarist from Los Angeles and a drummer from New York with a piano player from Montana according to the user's selection. Later if a better pianist more to the liking of the users found in Florida, that track can be switched out and a new arrangement or mixing made.

Many ways may be arranged whereby uploading or downloading musical tracks or mixtures of the same from server 12 can be charged as a cost to the user through an accounting module 24 to the user. In addition, royalties can be paid to the musicians of the various tracks from any monies for downloads through accounting's track and accounting module 24. Use of the system would require entry into SITE RULES page 40 whereby the user would consent to a license for this purpose to all other registered users of server 12. Thus system 10 provides a means whereby musicians, who may never actually physically meet or even communicate with each other, will be able to collaborate with each other on musical projects without restrictions as to global location or involvement in complicated transactional negotiations which must be repeated with every possible combination.

Figure 2:
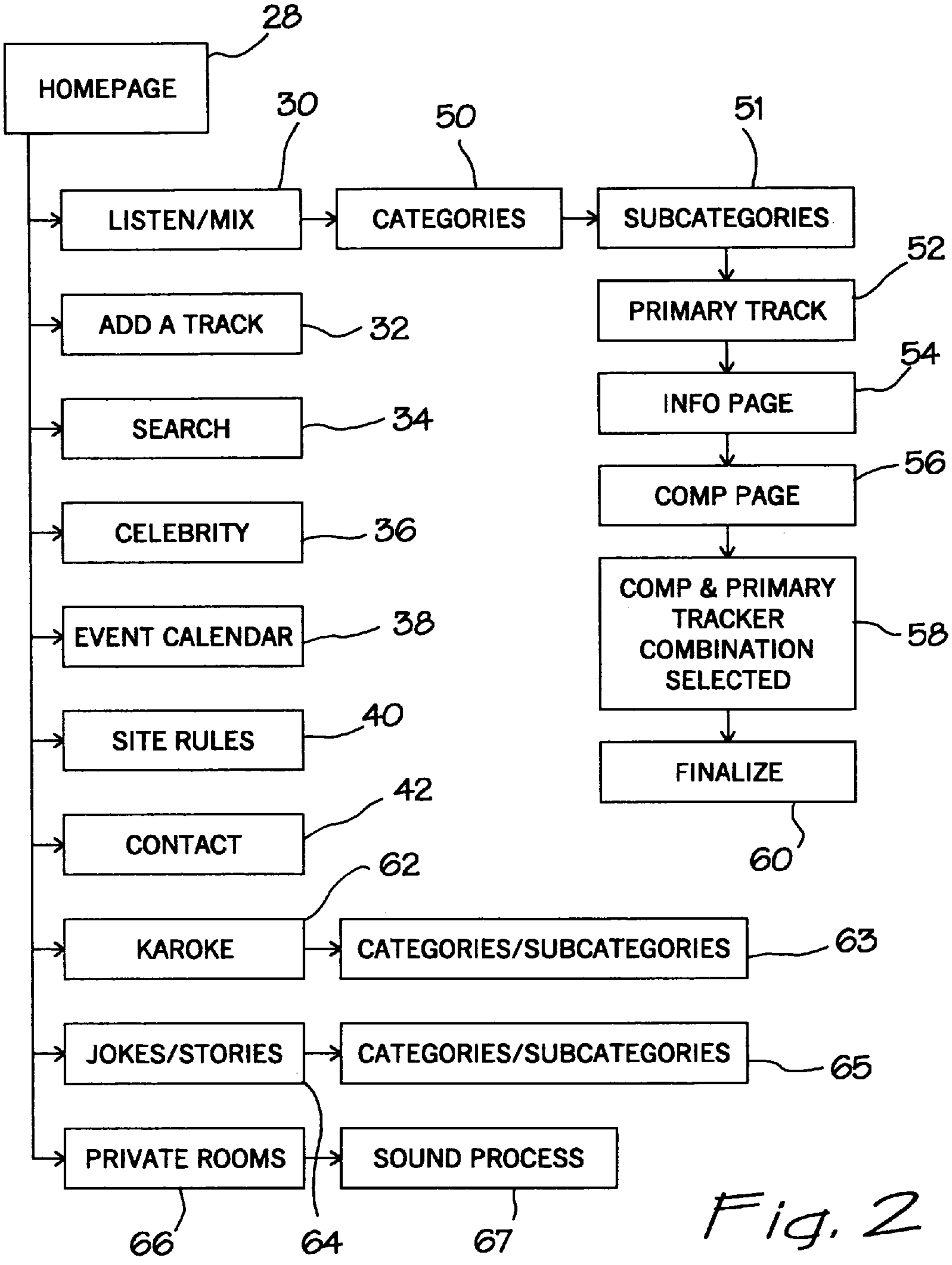
FIG. 2 is a block diagram which illustrates the architecture of the web site hosted by the server in FIG. 1 and the methodology of its interaction with the client.

The website begins as shown in FIG. 2 with a homepage 28 to which all other pages can later directly return with a single-click button. Apart from such informational or marketing information that the homepage 28 may contain, an illustrated embodiment homepage 28 also includes functional click-entry buttons to other web pages denoted by LISTEN/MIX button 30 which will allow the web user to listen to a previously recorded mixed soundtracks. ADD A TRACK button 32 allows web users to add additional tracks of music or sound from client 16. SEARCH button 34 allows the user to search the website for a specific entry point or to search track database 20 for selected soundtrack records. CELEBRITY button 36 allows, for example, special entry to tracks made by a celebrity artist whose tracks are made available within database 20. EVENT CALENDAR button 38 allows web users notice of upcoming events in which the use of the website is employed, such as contests, special musical promotions and other interactive marketing devices. SITE RULES button 40 provides access to web pages that can provide rules and etiquette, legal notices and administrative conditions to which web users may be subject in using the site. For example, in any public site in which the users may post musical tracks, statements or sound recordings, certain standards public decorum and taste may be required in addition to prohibiting access to users who engage in sound trash or music vandalism. CONTACT button 42 provides a convenient means whereby web users may e-mail the website administrator or business operator associated with the site.

Homepage 28 may also include many other click-entry points or toolbar pull-down menus to subsequent pages such as the TOP 10 list of the 10 most recent tracks or songs recorded on the site, a button for downloading recorder 18 to client sites 16, an option searching for soundtracks by specific identification numbers in track database 20 or showcasing the sound mixes of selected site users and their music. A pull-down window providing hyper jumps to proper pages dealing with subcategories in music is also contemplated. For example, a music category selection option can be displayed in a pull-down menu and immediately accessed.

In the illustrated embodiment activation of Listen And Mix button 30 presents a page 50 in which categories and subcategories of musical styles may be illustrated, such as Classical, Country, Easy Listening, Electronic, Folk, Gospel, Hip-Hop/Rap, Jazz, Latin, Pop, R And B/Soul, Rock And World/Reggae at a first or main level. Each of these main levels can then be broken down when selected in a subsequent subcategories page 51, such as in the case of Classical it may be subcategorized as chamber music, classical general and contemporary for classical. Clearly the categories and the subcategories is arbitrary and is dictated by not only musical tastes and customs at the time, but can be changed to track new categories of musical style as they arise and are recognized by the public.

Having picked a category and subcategory on page 51, a primary track selection page 52 is then displayed which will display a list of songs that meet the selected category/subcategory choice. Ultimately hundreds if not thousands of songs are contained in track database 20. Page 52 includes conventional means by which the number of songs listed may be screened, arranged alphabetically by title, by artist, by an unique identification number assigned to each track by server 12, by date of submission, by type of musical instrument and the like. A one click button allows the user to listen to a 30–45 second low fidelity preview of the sound. Another one click button allows the user to see the accompaniment tracks which have been uploaded into database 20 corresponding to each primary track.

Once the particular song is chosen on page 52 an a information window on that page or another page 54 may be displayed where relevant information such as the song title, artist, the main instrument, the date that the primary track or track in question was submitted, the location of the submitting artist, the unique song identification number and an e-mail address for the artist may be displayed. The song or track so identified may then be identified for a sampling period or replay of the entire song, which is downloaded in a streaming audio.

In the preferred embodiment the first track which will be displayed which contains a melody or what has been identified as the melody track. Selection of the song title and artist will then bring down a pull-down menu or another page 56 in which comptracks available for mixing to the primary track have been created such as shown in information window or page 54. Here again the comptracks will include options of whether or not to include it in the mixed work, the musician of the comptrack, the main instrument of the comptrack, date submitted, location of the artist, unique identification number of the comptrack and the artist's e-mail. Each primary may be previewed separately through streaming audio either in a sample or in its complete rendition. One or more comptracks are selected and can be played in full or sample form and then can be mixed with the selected the primary track for preview or full streaming audio replay from page 56. After any sampling or replay, comptracks can be deselected according to user choice. Then other comptracks added or not dependent on user choice from the comptrack listing page 56. At any point in time the primary track and the comptracks which have been associated with it are also separately displayed in a window 58 along with a listing of non-selected comptracks in window 56 in separate frames. Once the user has made the final selection of the primary track with comptracks, the opportunity is then given to finalize the selected mix by clicking finalize button 60. The user selection is then communicated from server 12 to mixer 22 which retrieves the identified stored tracks from database 20, mixes them and presents them to server 12 for transmission over internet 14 as a single musical track in a compressed high fidelity or stereo format.

The transmission of the musical track on internet 14 can also be accompanied by graphics and text, such as photographs of one or more of the artists, comments or descriptions concerning them and their work. All of the information concerning the tracks and the artists associated with them discussed above can then be downloaded for permanent record through client 16 and to recorder 18 as well as being played in the streaming audio with visual display. Mixed sound recording may also be downloaded into a permanent file or CD through client 16. Before or after completion of a transmission of a mixed recording, accounting module 24 collects information from the user which will be needed for payment. Conventional "shopping cart" multiple purchase capability is included within accounting module 24 to all batch downloads and purchases. In addition, users of the web site who upload tracks may be given credits for their uploads by accounting module 24 for use in payment of subsequent downloads.

The sound file format used in the invention is arbitrary, but in the preferred embodiment a conventional wav format is used. When a mixed wave file is compressed according to the invention it may, for example, be compressed using a "wave zip" compression technique to a smaller file size for internet transmission which will then be unzipped by recorder 18 after reception by client 16.

In addition to the interactive mixing described above, homepage 28 may also be provided with additional audio click buttons such as a KARAOKE button 62 where the user may record a vocal track against a single track of full mixed musical accompaniment, which is also provided with a streaming text in a manner similar to conventional karaoke. In addition to music, any sound may be recorded and listed to a bulletin board a sound file such as through a JOKES/STORIES button 64 which will allow the teller of a joke or story to tell his or her own joke or story in their own voice. Again, activation of JOKES button 64 leads to one or more pages which can provide categories and subcategories of different types of jokes or stories to be listed in a similar higher article manner as different styles of music and songs.

A PRIVATE ROOMS button 66 allows selected users to access a "virtual recording room", the access to which has been restricted to a invited-only list, so that only invitees will be able to add accompaniment tracks or have access to a primary track. By this means a professional artist, who may record the primary track, will be able to name certain accompanists in different locations, who will then be invited and will be the only ones permitted to hear the tracks and add their own track. The recording and its process of production will thus be withheld from public hearing. Once in PRIVATE ROOM 66, the users are presented with similar pages and choices, collectively denoted as pages 67 as described above in connection with pages 50–60, although the tracks involve those which have been marked private and which not available to general users, but are only made available to the invitee list. This is not to exclude, however, the importation and use of public tracks into PRIVATE ROOM 66.

In addition, in a private room may provide advanced sound mixing controls may be added to the professional user to allow more sophisticated or interactive mixing choices and techniques similar to those available in a professional sound recording studio.

Consider now an example how the database 20 is organized in the preferred embodiment. In addition to having accounting data as is conventional in internet business sites, track database 20 will include for each user a picture field for use of the web pages. Files included in the database may be provided with a number of functional extensions such as, wav for conventional wave files for sound, .rhy for rhythm files, .jok for joke files, .kke for karaoke files and the like. Although technically each of these files will be in the same standard wave format, segmenting the files with suffixes proprietary to the website is useful in the management of the site and its audio services. During file transfer, the wav files will be sent as compression files such as with a .cmm extension. Royalties will only be tallied for tracks with a wave extension. The fields that be associated with any user submission then include the unique identification number, song name, artist, date submitted, main category, subcategory, melody track, rhythm track, comptrack, location, main instrument, key, comments, e-mail, comp identification, and include last access, track file name, and the number of requests made for the track. Other fields can be added to each submission by a user according to conventional design considerations.

How does the Mixing Process actually work?

All music files are submitted to the central server by means of normal network file transfer protocols. The files when they arrive must be in either a standard WAV format or in a compressed format called ASF or WMA. These last two formats are developments of Microsoft which allow the compression of music (or sound) files to obtain compression ratios of up to 20 to 1.

The server software which is actually sending and accepting commands from the end users' browser software will request the location of the sound files on the users' computer. When the user supplies the server with this information, the browser will then use built-in facilities to 'upload' that specified file up to the server. This file when uploaded will be placed in a temporary directory or folder. Here it will wait until a special server side program has a chance to analyze the submitted file.

If the file was submitted in ASF or WMA format, those files must first be turned into true WAV format files before further processing. These routines are available from Microsoft. In order for the proper mixing to take place it is required that the format of each file (or track) is of the same quality. What is meant here by "quality" is that that the sound file must have the same bit rate, frequency and channels as any other file that it will be mixed with. Bit rate can be described as the density of the sample. The higher the bit rate the better the sound because the sample will contain more sound information. It is normally expressed as 8 bits or 16 bits.

The frequency can be described as 'how often does the recording device actually take a snapshot of the given sound'. Again, the more often a snapshot is taken the better the complete picture or sound will be. The frequency is noted by Hertz or KiloHertz. Normal frequencies are 11 kHz, 22 kHz and 44 kHz. The final quality attribute is 'Channels'. One channel is what is called 'mono' and two channels is called 'stereo'. Stereo has a left and right channel.

In the illustrated embodiment the following quality settings are chosen 16 bit, 22 kHz and mono. These settings seem to provide the best combination for the application when considering both sound quality and the effective use of space. Higher settings could yield slightly better sound quality but not so much as to have a normal person hear the difference. Any combination would work to greater or lesser degrees and all other quality settings are expressly contemplated as being within the scope of this invention. Again, whatever combination is chosen, they just need to be substantially the same for all files if they are going to be mixed.

The submitted files which are being held in a temporary directory are checked for their quality settings by reading the header of the files. If the file is not the same as the stated standard, that file will be altered in quality to make it the same. This is done by reading the file from the disk at it's lowest level (byte by byte) and then systematically making needed changes in the file to either 'upgrade it' or 'degrade it' to the desired level of quality.

Once the file has been confirmed to be of the standard quality it is placed in a folder where all other files of similar quality are kept. All along during this transport and transformation process the file has been given a unique file name that is stored in a server side database that knows that this particular file (track) is associated with a given song. This means that that this track can only be mixed with other tracks that point to the SAME song.

Server Side Mixing

By nature and design of the network/internet site, the end user will select at random various tracks for a given song to see how well they sound together. For example one track may have a guitar on it while another may have a bass guitar and another may have drums or vocals. After the user has made up his/her mind, the server side mixing program will be instructed to mix (in real time) file1, file2 and file3.

This is done by reading each listed file at a low file level (byte by byte) and looping through each file gathering bits of information and joining them together. For example the software will open File1 and after skipping over the header information which is a known certain length, will obtain the first byte of actual digital data. It will then do the same to File2. It will then do the same for File3. Once it has gathered the first byte of information from all three files, the software will then ADD the digital information together. The result of this addition will then be divided by 3 (the number of files in the mix) and then that calculated piece of digital information will be written to disk in a newly opened file.

The program will continue the process, incrementing itself after each loop through all three files to make sure it goes from the first byte to the second, to the third, to the fourth etc. until there is no more data to be read. While doing this, it is at the same time appending the new data to the end of the new file. When done the original files are released and the new file is closed and saved.

The resultant file ends up being an average of all the included files. Tracks that were recorded very loud as a stand alone file are no longer as loud when mixed with tracks that are of a softer nature. Tracks of a similar volume will maintain that volume because that's the mathematics of mixing.

Once the tracks are mixed, it is impossible to 'unmix' them. The sounds are so intertwined within the digital information, it is next to impossible to extract the original and separate tracks. For this reason the data management of the central server must keep the original tracks as individual files.

The end user may select to hear only a sample of a song when accessing the server and its files. This process is done by accepting a parameter such as 30 seconds, 1 minute, 2 minutes etc. at the same time of track selection. The Mixing software will be aware of this parameter when it attempts to mix the files and will therefore take the resultant file and loop through it only until the desired length is reached. For example, 30 seconds is represented as 30,000 milliseconds. Since the system already deals with the loops in milliseconds, it is an easy task for it to take this number and know how many times it needs to go through the loop.

Each file that gets made as a request from an end user takes up considerable space on the server's hardware. Therefore, systematic routines have been created to simply 'clean up' these temporary files on a regular basis. Doing this helps prevent the system from running out of resources too quickly.

Client Side Mixing

The complete cycle for cyber space mixing involves work to be done on the 'Client' (or local) computer. That local work will typically be done by a musician. The end user to this process does not really come into play here because they would normally not be submitting any tracks.

Software for the client computer compliments the functionality of the software residing on the server. This software allows a primary track to be played at the same time that a recording is being made of a secondary track. The awareness of the intended use of this secondary track (to later be mixed on the server) requires that it would be possible to synchronize the random selection of musical tracks by non technical people.

Synchronization of is a critical piece of the technical solution, especially for music. One could reasonably merge two voice conversations into one track, since an unsynchronized version that is off by half a second is hardly noticeable. However, in the music world, a half second delay might as well be five minutes. Musical compositions have a beat or tempo to be concerned with and the client side software is aware of this fact and accomplishes it's synchronization in the following manner.

Computers can seemingly do a lot of things at one time. The truth is that the computer can do a lot of things 'rapidly' one thing at a time. To the human perspective it seems things are occurring at the same time but from a programmers view of things they can see that events happen one by one. Music recording is a processor intensive application. It will require late model computers with sufficient CPU power to handle the job. Generally 333 MHz machines or higher can master the task with no problems.

This invention involves the unique manner in which a new recording can be made to synchronize up to a recording that may have been made days or even weeks earlier. This process has to be considered on each and every individual machine which may be doing the recording. The first step in this process is to determine the 'sync factor'. The 'sync factor' is numeric property that internally points to a specific sync file on the disk. It works as follows. The client software has a pull down menu choice that performs the Sync Test. This test comprises the steps of a short recording that plays a steady but slow drum beat. Along with this drum beat is human speaker who counts from 1 to 10 in a slow but deliberate manner. The musician will then record themselves counting along with the speaker from 1 to 10, keeping in mind that they want to be as close in sync to the 'live' sound as they possibly can. When done the musican's voice is saved to disk.

The musician can then play back their voice and up to ten samples of their voice matched up to the recorded speaker's voice. The musician can then select which of the ten samples, sound 'most' in sync. At least one of the choices should sound very good. This becomes their 'Sync Factor'.

From a technical point of view what is really happening is rather simple but is quite unique. While recording this test or a real track later on that there is a distinct possibility that the secondary track will not synchronize perfectly to the primary track. Therefore the secondary track is padded with a choice of either ten 'SILENT' sync files. One of these files is appended to the beginning of the track to extend the track by 1 of 10 varying lengths. These silent sync files are extremely small, starting at approximately 100 milliseconds (1/10th of one second) in length and graduating up to ½ second (or 500 milliseconds).

This unique padding of the front portion of the file means that the attached music is pushed back by a factor of 100,150,200 etc milliseconds. Pushing this music back by the appropriate amount allows it to be synchronized to the primary track which always remains unchanged. Therefore when the server side mixing software goes about its job of taking the first byte of File1 and then the first byte of File2 etc. it will actually be carving out musical content that is supposed to be in beat with each other. Without this padding technique, the joined files would always be slightly out of time. The resultant files put through this process maintain their true WAV format identity. Thus the files can be used anywhere such files are normally accepted.

Figure 3:
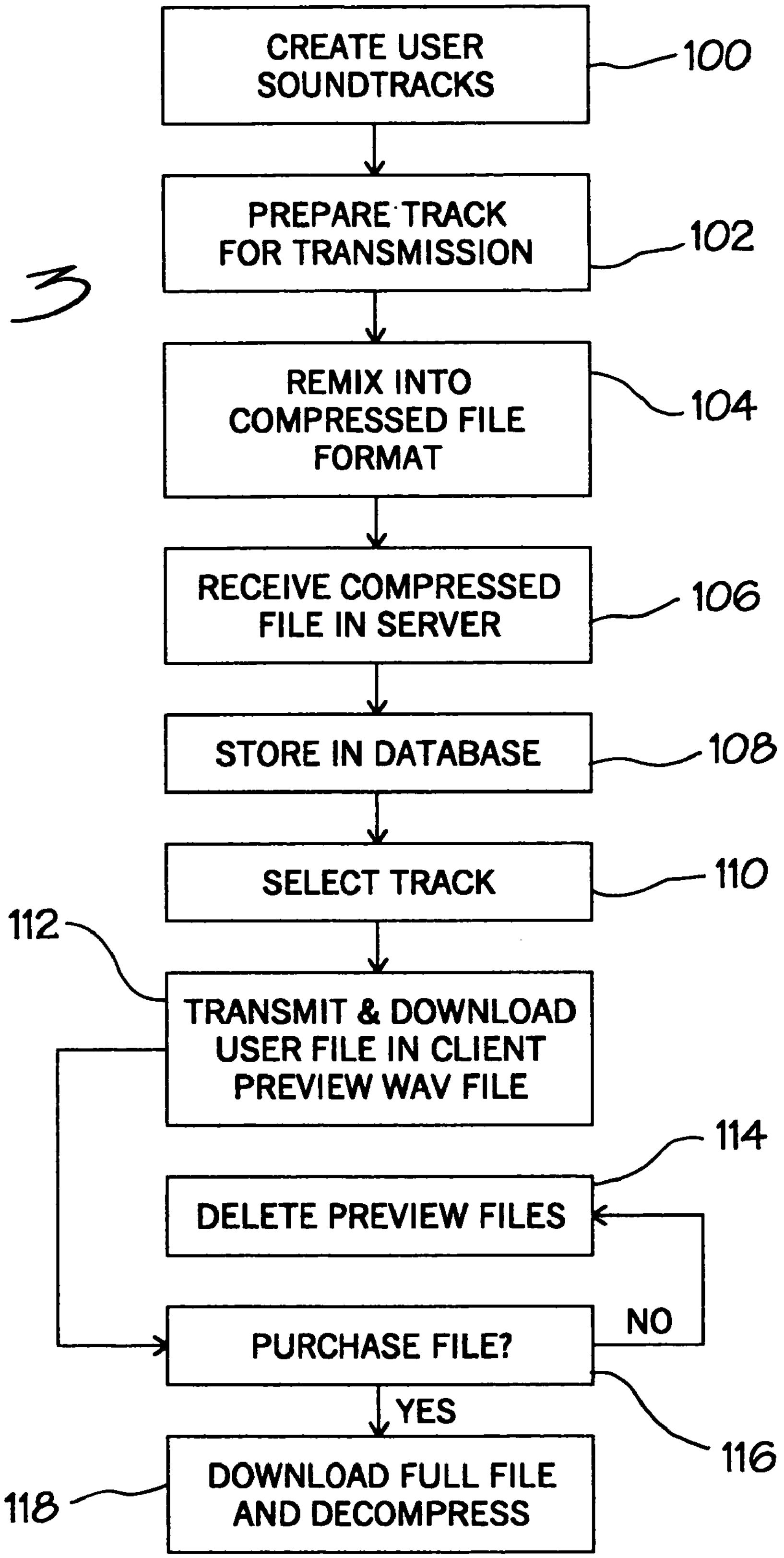
FIG. 3 is a block diagram which illustrates the manner in which the audio files are uploaded from the client to the server, then mixed in a sound track, downloaded or streamed as a preview to the client, and then purchased and downloaded in full form into the client.
Figure 4:
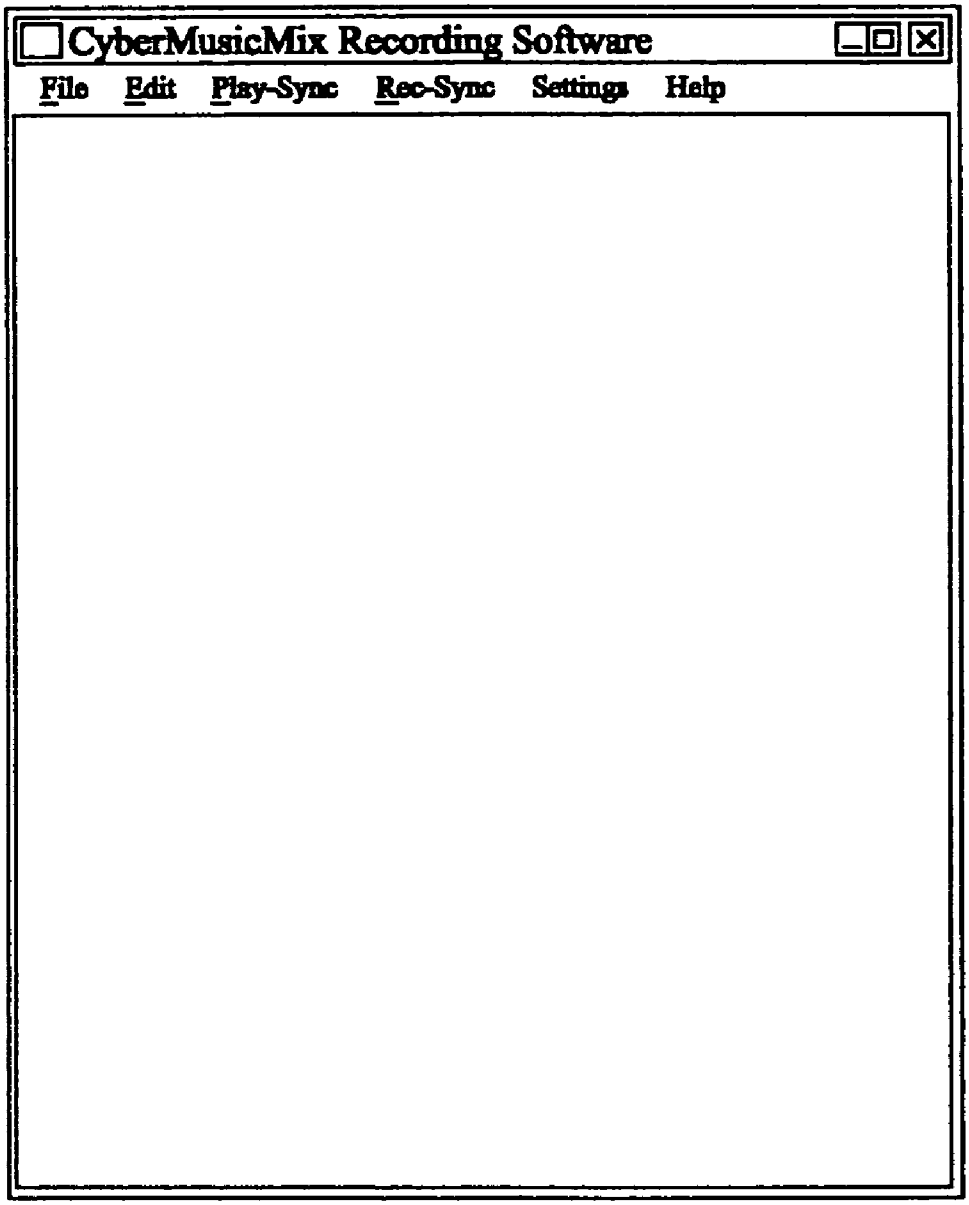
FIG. 4 is the screen of the offline recorder in the invention which is stored in the client and is user controlled to play and record tracks.
Figure 5:
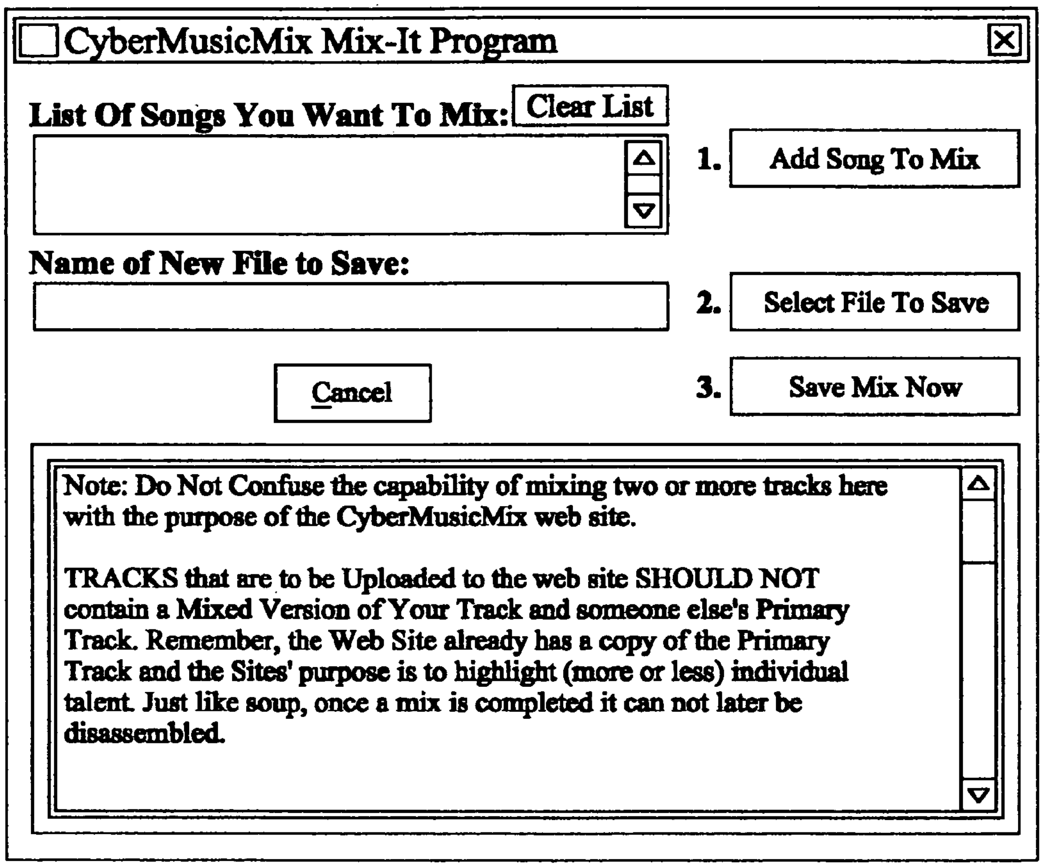
FIG. 5 is the screen for the EDIT option, MIX TWO TRACKS INTO ONE WAV FILE.
Figure 6:
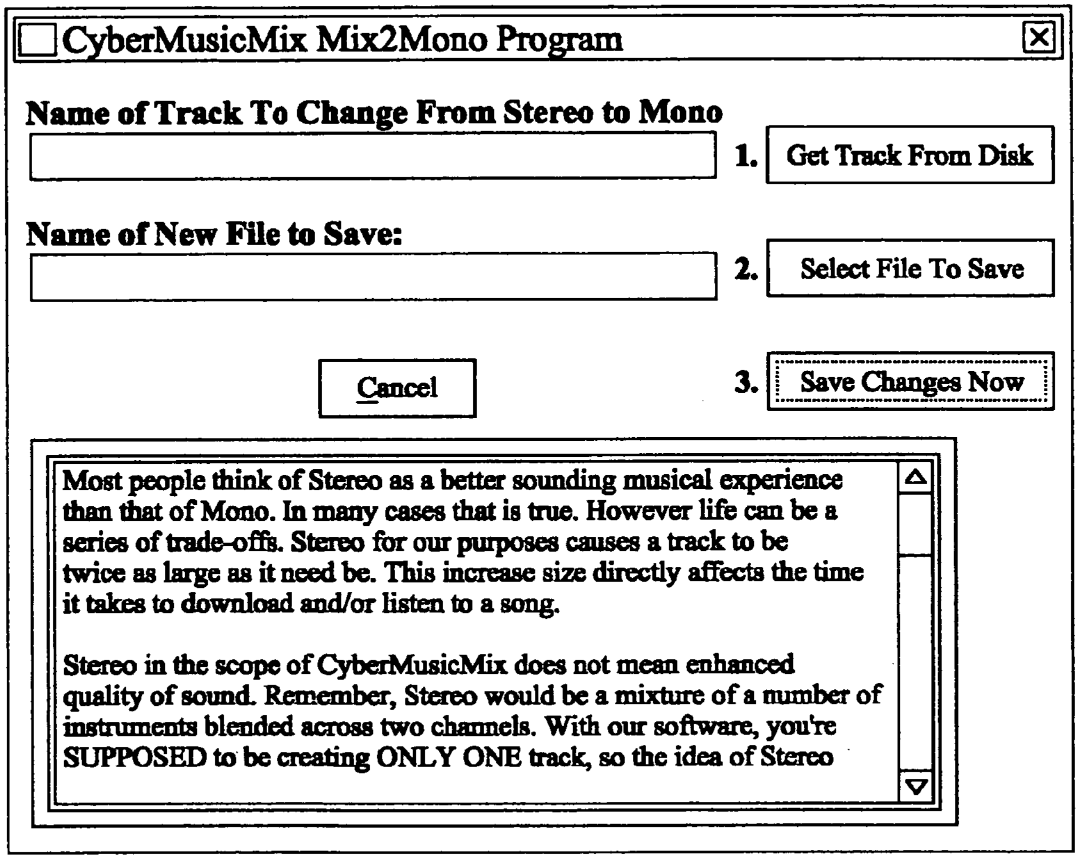
FIG. 6 is the screen for the EDIT option, CHANGE A TRACK FROM STEREO TO MONO.
Figure 7:
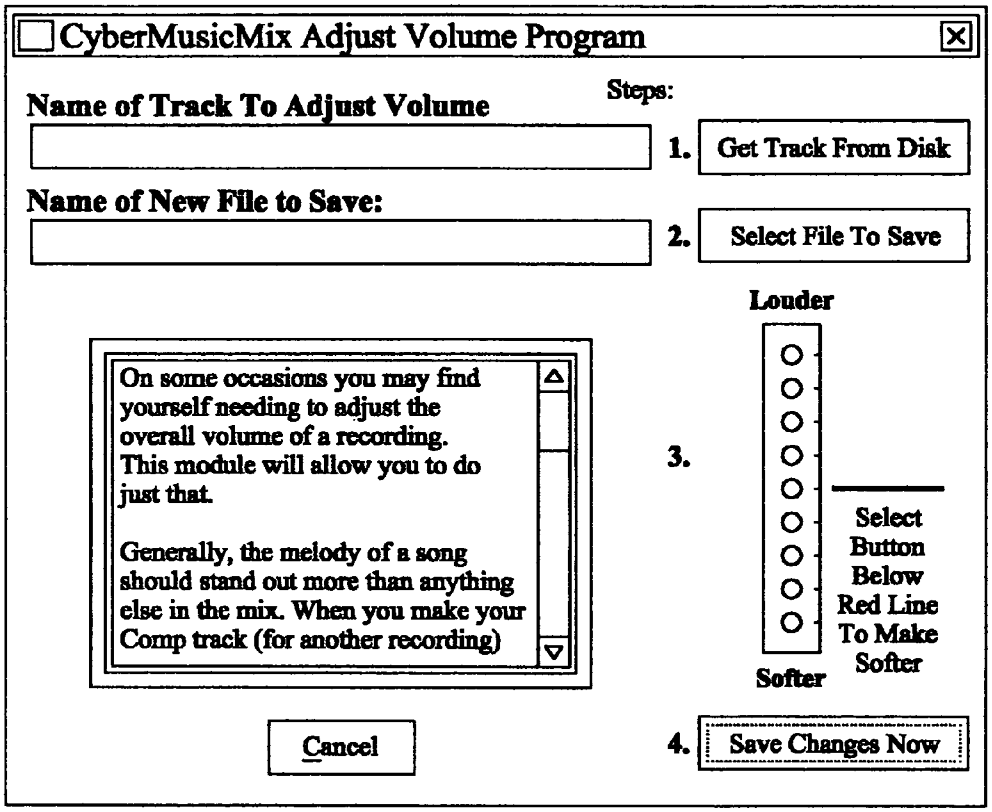
FIG. 7 is the screen for the EDIT option, ALTER THE OVERALL VOLUME OF A TRACK.
Figure 8:
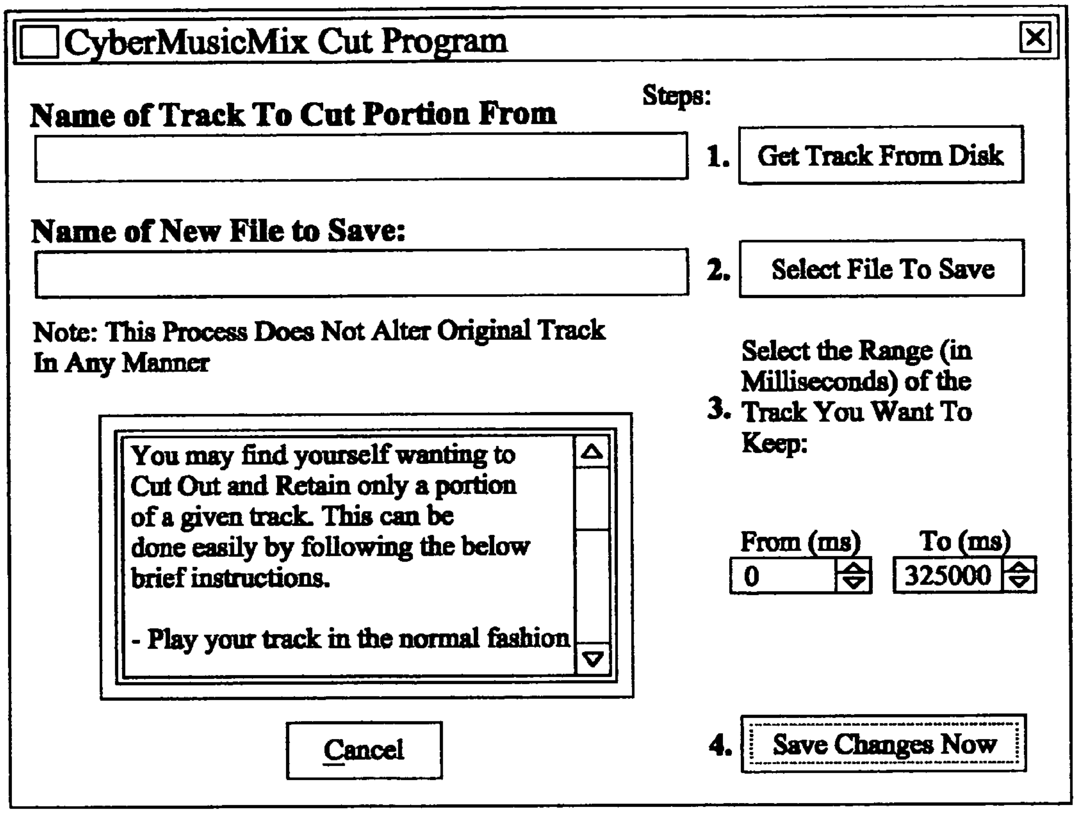
FIG. 8 is the screen for the EDIT option, CUT OUT AND RETAIN A SMALLER PORTION OF A TRACK.
Figure 9:
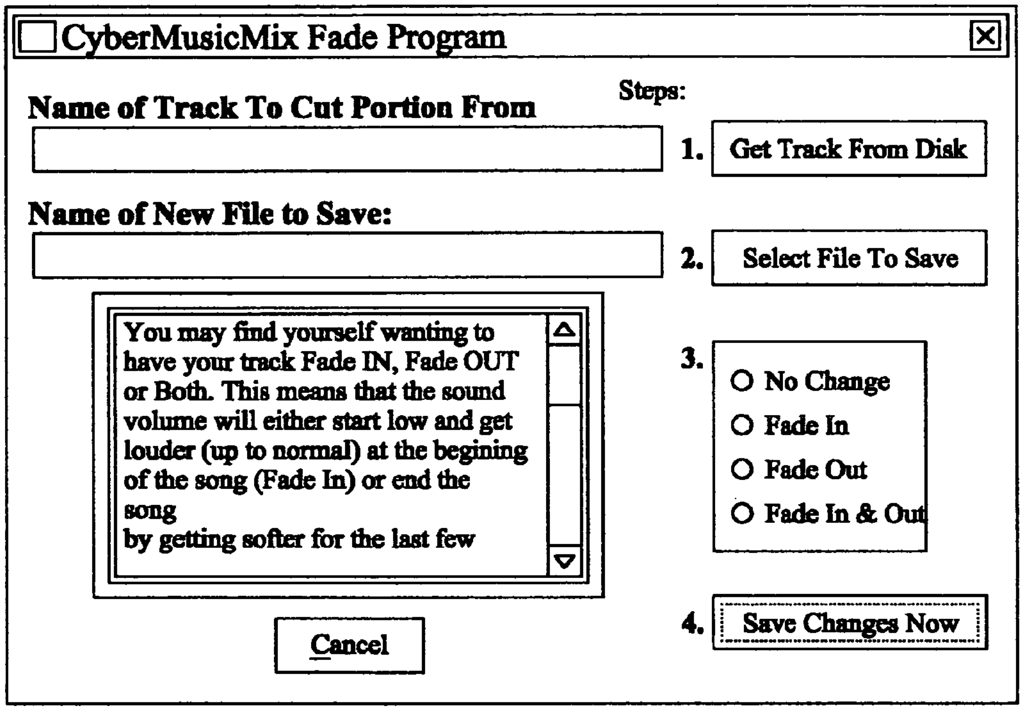
FIG. 9 is the screen for the EDIT option, FADE IN AND FADE OUT PROCESSING.
Figure 10:
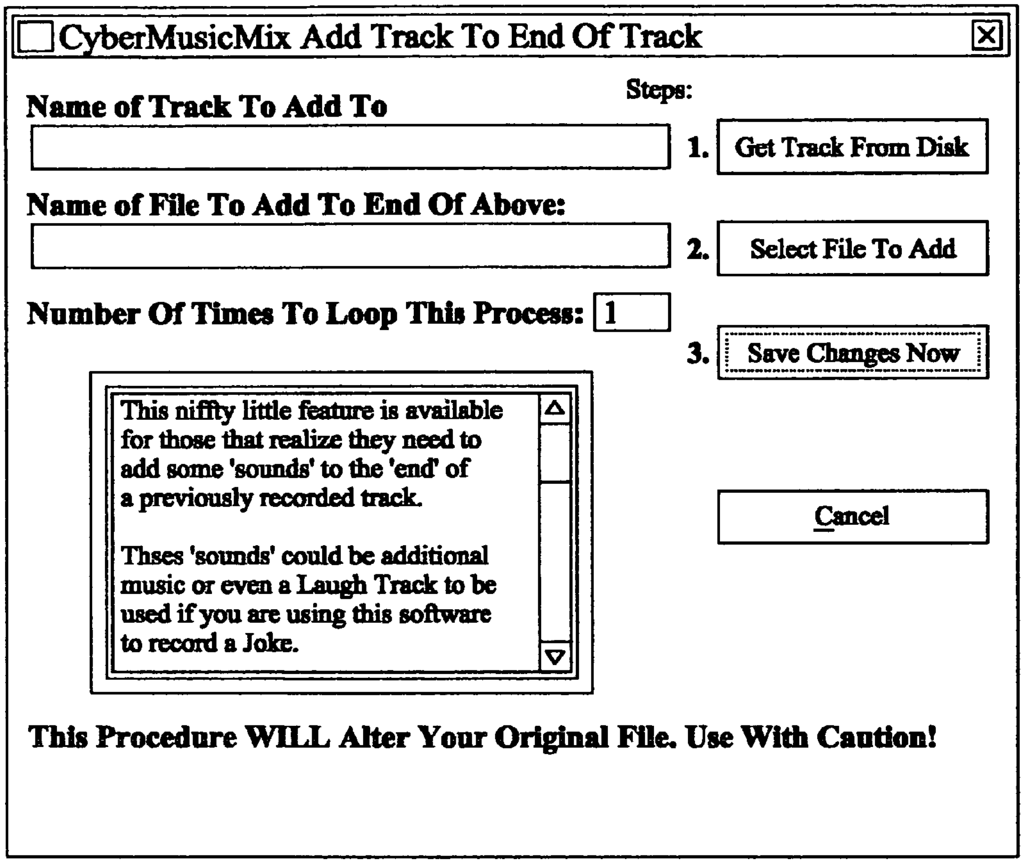
FIG. 10 is the screen for the EDIT option, ADD A TRACK TO THE END OF ANOTHER.
Figure 11:
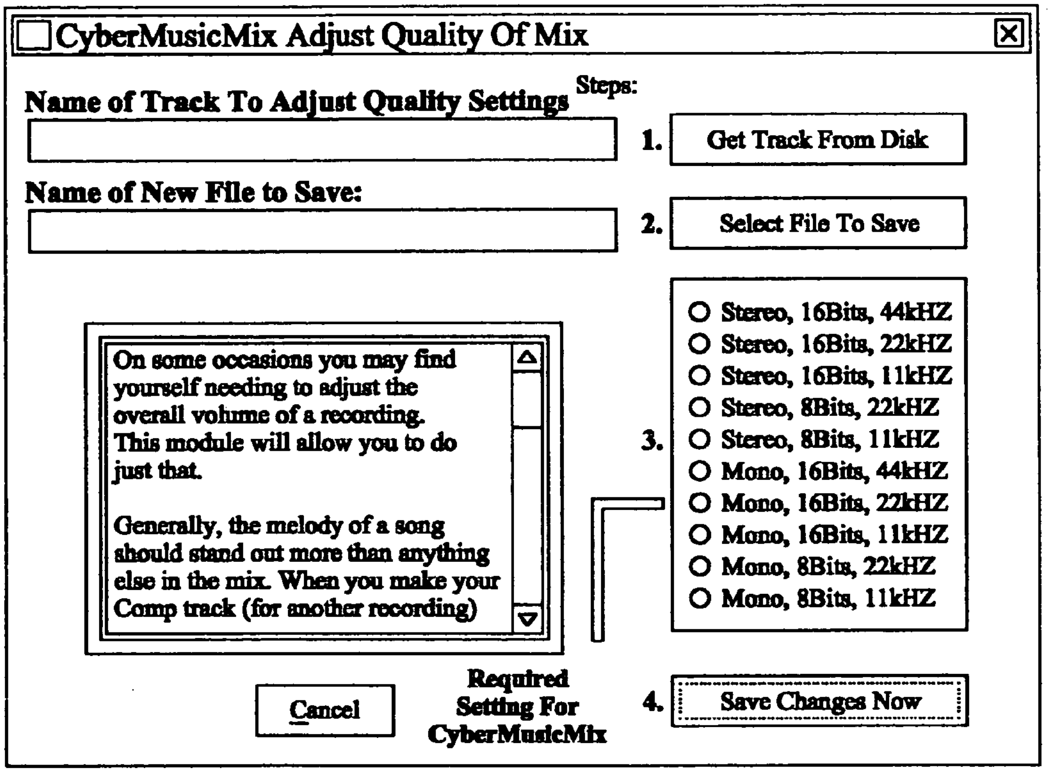
FIG. 11 is the screen for the EDIT option, CHANGE THE QULAITY SETTINGS OF A TRACK.
Figure 12:
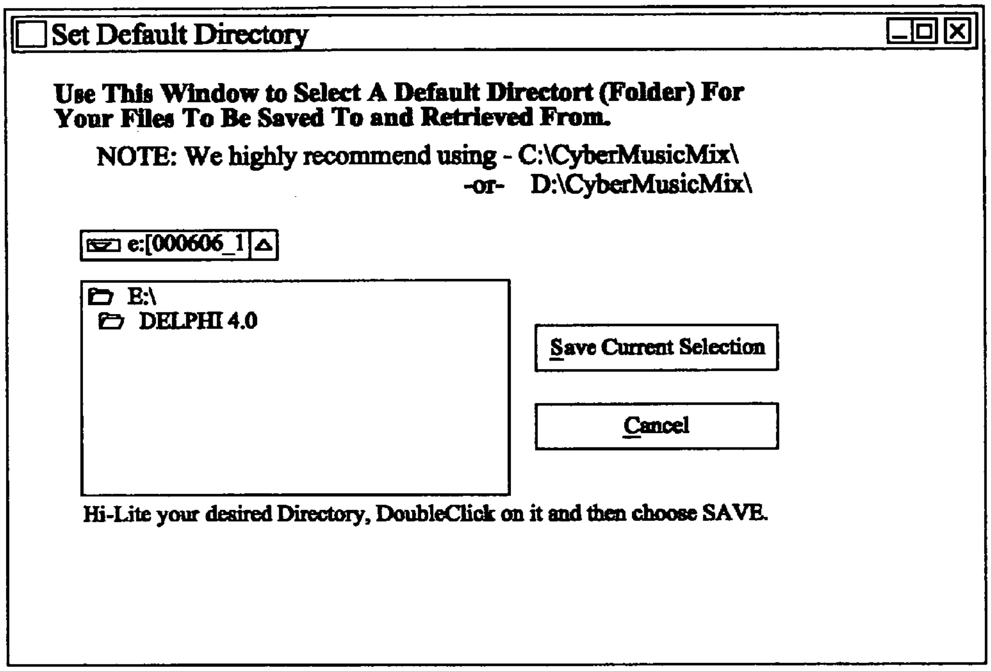
FIG. 12 is the screen for the SETTINGS option, SET DEFAULT DATA DIRECTORY.
Figure 13:
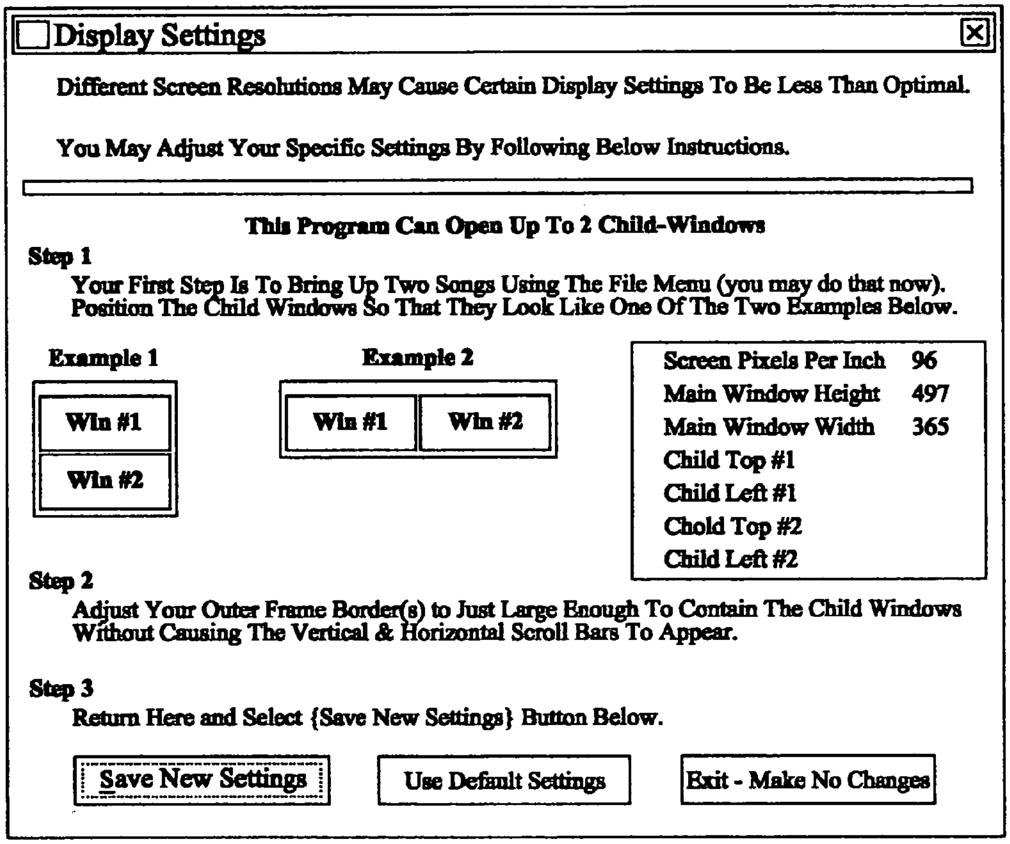
FIG. 13 is the screen for the SETTINGS option, SET SCREEN LAYOUT DEFAULTS.
Figure 14:
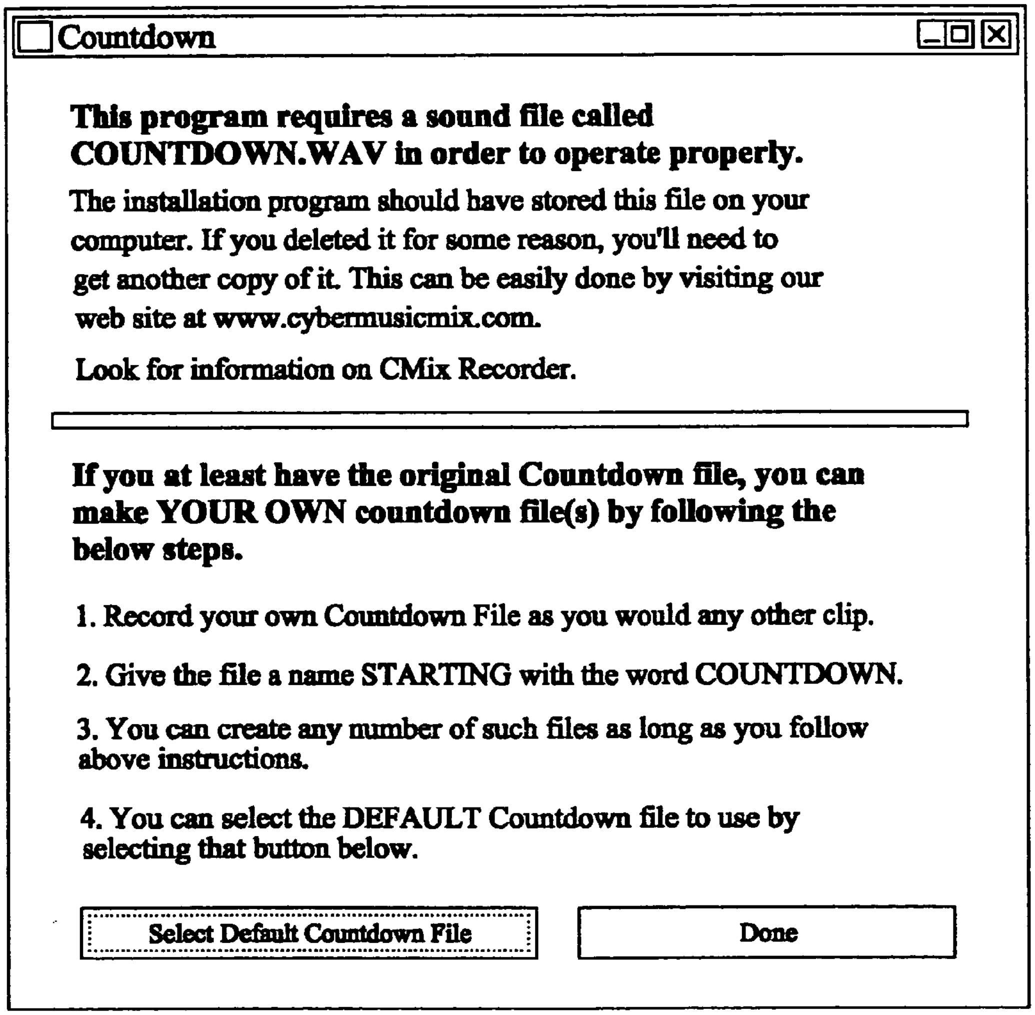
FIG. 14 is the screen for the SETTINGS option, SET COUNTDOWN DEFAULTS.
Figure 15:
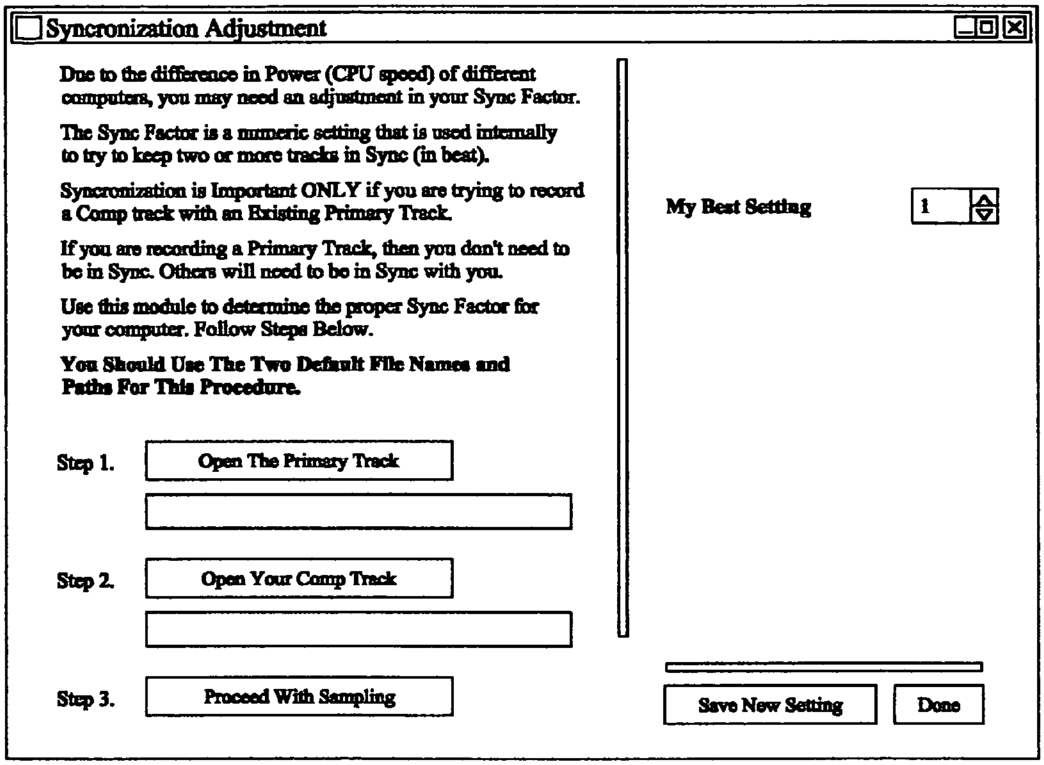
FIG. 15 is the screen for the SETTINGS option, of SET SYNCHRONIZATION FACTOR.

Consider now how wav files are transferred and stored for use on system 10. As shown in the block diagram of FIG. 3. The process starts on client 16 using recorder 18 as shown in Step 100 of FIG. 2. The user creates one or more songs or tracks. Recorder 18 records those tracks in standard wav files. When the user is ready to upload the tracks to server 12, software within recorder 18, denoted as a C-mix software, prepares the track for transfer as step 102. As shown as step 104 the track is remixed into a proprietary standard file format, such as a monaural, 16 bit, 22.05 kHz sampled, music track. A laugh track can be added to the end of the joke for the plurality of such tracks available. The file is then compressed to its smallest size using a conventional codec modified as necessary to be compatible with the software of system 10. A copy of the compressed file is then uploaded from recorder 18 into designated location within client 16. In step 106 the compressed file is received by server 12 and the transmitted file is uncompressed. A wav file is created with a unique file name generated by server 12. The compressed version may then be erased to conserve space. The unique file name is then saved into the members record as a pointer to the transmitted file. In step 108, the file is then stored within database 20 to wait for a request as selected as part of the mix.

When as step 110 someone selects the identified track as part of a sound mix, the track will be mixed with other selected tracks. It is synchronized to other tracks with an accuracy of milliseconds based on the start of recording of the primary track. For example, a sampling length of 30 to 45 seconds is created and then the shortened preview is resampled at a lower rate and quality to allow for reasonably sized preview downloads in system 10. The file is provided with a wav extension and file name which is again unique but is prefixed with a designator indicating it as a preview file. The preview file is then referenced in the HTML or ASP page as the link to the file. This causes the browser to automatically download the file into the user's internet temporary file folder as well as to trigger the user's default player of wav files as shown in step 112. The site will not stream although it may be alternatively configured to do so if desired. In step 114 with a prefix, "preview", both server 12 and client 16 can easily manage and clean the files from their respective hard discs if necessary. Deleting preview files with the unique identifier is easily and safely accomplished because of the file labeling described above. Server 12 provides such deletion maintenance on a daily basis.

Step 116 designates the situation where client 16 previews the 30–45 second clip of the selected track through recorder 18 that has been resampled to a lower quality sound in order to reduce file size and decrease file transmission. If the user decides to purchase the remixed track then a different set of rules for file transfer will of course apply. As shown in step 118 a purchase means that a download of the complete song follows and it also means that the original quality of the recording will be maintained. The sound is then mixed as normal and then compressed in the same manner as when uploaded into server 12. The compressed files begin with a .CMM file extension for transfer. The user is asked by the browser where to save the file and client 16 then saves the file within an appropriately designated download area on its hard disc. C-mix recorder 18 then decompresses the file. Decompressing changes the file into an actual wave file which is then recorded into an appropriate directory through client 16. At that point, the selected song can be replayed at full fidelity or reprinted into a local CD as desired.

While normal public use of system 10 will not allow a full fidelity play on the internet to conserve bandwidth, such transmissions will be permitted private room sessions with full fidelity as part of the enhanced service provided to premium customers who will be charged at a different rate by accounting module 24 for this usage.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An apparatus for delivering a user-selected plurality of mixed data files over a distributed network with a plurality of users comprising:

a server coupled to said distributed network;

a plurality of remote clients coupled to said distributed network;

a database for storing said plurality of data files communicating with said server;

a mixer communicating with said database and server for selectively mixing selected ones of said plurality of data files together to generate mixed data files; and a recorder communicating with said plurality of clients for recording corresponding user-created data tracks, said plurality of clients transferring said corresponding user-created data files to said server and hence to said database.

2. The apparatus of claim 1 wherein said server transfers a user-selected mixed data files to selected ones of said clients, the mixed data files each comprised of at least two data files selected by corresponding users from said database and combined by the mixer.

3. The apparatus of claim 2 wherein each selected client replays said mixed data file.

4. The apparatus of claim 2 wherein each selected client stores said mixed data file.

5. The apparatus of claim 1 wherein said data files processed by said server, client, database, mixer and recorder process comprise audio data files.

6. The apparatus of claim 5 wherein said audio data files processed by said server, client, database, mixer and recorder process comprise music data files.

7. The apparatus of claim 6 wherein said data files processed by said server, client, database, mixer and recorder process further comprise associated text data files.

8. The apparatus of claim 6 wherein said data files stored on said database include data fields for categories and subcategories of data files.

9. The apparatus of claim 8 wherein said categories and subcategories of data files comprise categories and subcategories of music styles.

10. The apparatus of claim 6 wherein said data files stored on said database are characterized as a primary track data file or an accompaniment track data file.

11. The apparatus of claim 10 wherein said mixer mixes into a single data file one primary track data file with at least one accompaniment track data file.

12. The apparatus of claim 11 wherein said mixer mixes a plurality of accompaniment track data files with said primary track data files.

13. The apparatus of claim 11 wherein at least one of said primary track data file or said accompaniment track data file is user created.

14. A method for concurrently delivering a user-selected plurality of mixed data files over a distributed network to a plurality of users comprising:

recording a user-created data files on a plurality of clients corresponding to the plurality of users;

transferring said user-created data files from said corresponding plurality of clients to a server on said distributed network and to a database communicated with said server; said database having stored thereon a plurality of data files;

mixing selected ones of said plurality of data files together according to corresponding user selections; and transferring said mixed plurality of data files from said server to said corresponding clients via said distributed network.

15. The method of claim 14 wherein mixing selected ones of said plurality of data files together mixes at least two data files selected by one of the plurality of users from said database.

16. The method of claim 15 further comprising replaying said mixed data files by selected ones of said clients.

17. The method of claim 15 further comprising storing said mixed data files in corresponding ones of said clients.

18. The method of claim 14 where transferring said user-created data file from clients to said server, mixing selected ones of said plurality of data files together and transferring said mixed plurality of data files from said server to said clients comprise transferring a user-created audio data file from said clients to said server, wherein said database has a plurality of audio files stored therein, mixing selected ones of said plurality of audio data files together, and transferring said mixed plurality of audio data files from said server to said corresponding clients.

19. The method of claim 18 wherein transferring user-created audio data files from said clients to said server, mixing selected ones of said plurality of audio data files together, and transferring said mixed plurality of audio data files from said server to said clients comprise transferring user-created music data files from said clients to said server, mixing selected ones of said plurality of music data files together, and transferring said mixed plurality of music data files from said server to said corresponding ones of the clients.

20. The method of claim 19 further comprising:

creating a text file associated with a user-created data file on a client;

transferring said associated text file from said client to a server on said distributed network and to a database communicated with said server, said database having stored thereon a plurality of data files each with a text files associated therewith; and transferring said mixed plurality of data files from said server to said clients via said distributed network with associated text files corresponding to each data file which has been mixed together.

21. The method of claim 19 wherein transferring said user-created data files from said clients to a server on said distributed network and to a database communicated with said server comprise transferring said user-created data files with fields for categories and subcategories of data files.

22. The method of claim 21 wherein transferring said user-created data files with fields comprise transferring said user-created data files with fields for categories and subcategories of music styles.

23. The method of claim 19 wherein transferring a user-created music data file from said clients to said server comprises transferring said music data files as a primary track data file or an accompaniment track data file.

24. The method of claim 23 further comprising mixing into a single data file one primary track data file with at least one accompaniment track data file.

25. The method of claim 24 further comprising mixing a plurality of accompaniment track data files with said primary track data files.

26. The method of claim 24 wherein recording user-created data files on corresponding client records at least one of said primary track data files or said accompaniment track data files.

* * * * *